US012626142B2

(12) United States Patent
Saboori et al.

(10) Patent No.: US 12,626,142 B2
(45) Date of Patent: May 12, 2026

(54) SYSTEM AND METHOD FOR AUTOMATED DESIGN SPACE DETERMINATION FOR DEEP NEURAL NETWORKS

(71) Applicant: Deeplite Inc., Montréal (CA)

(72) Inventors: Ehsan Saboori, Montréal (CA); Davis Mangan Sawyer, Montréal (CA); MohammadHossein Askarihemmat, Montréal (CA); Olivier Mastropietro, Montréal (CA)

(73) Assignee: Deeplite Inc., Montréal (CA)

( * ) Notice: Subject to any disclaimer, the term of this patent is extended or adjusted under 35 U.S.C. 154(b) by 1041 days.

(21) Appl. No.: 17/250,926

(22) PCT Filed: Nov. 18, 2019

(86) PCT No.: PCT/CA2019/051642
§ 371 (c)(1),
(2) Date: Mar. 29, 2021

(87) PCT Pub. No.: WO2020/102887
PCT Pub. Date: May 28, 2020

(65) Prior Publication Data
US 2022/0335304 A1 Oct. 20, 2022

Related U.S. Application Data

(60) Provisional application No. 62/769,403, filed on Nov. 19, 2018.

(51) Int. Cl.
*G06N 3/08* (2023.01)
*G06F 18/2115* (2023.01)
(Continued)

(52) U.S. Cl.
CPC ......... *G06N 3/088* (2013.01); *G06F 18/2115* (2023.01); *G06N 3/045* (2023.01); *G06N 3/08* (2013.01)

(58) Field of Classification Search
CPC .......... G06N 3/088; G06N 3/045; G06N 3/08; G06N 3/006; G06N 3/063; G06N 3/0464;
(Continued)

(56) References Cited

U.S. PATENT DOCUMENTS

| | | | | |
|---|---|---|---|---|
| 2016/0078339 A1* | 3/2016 | Li | ........................... | G06N 3/045 706/20 |
| 2018/0260665 A1 | 9/2018 | Zhang et al. | | |

(Continued)

FOREIGN PATENT DOCUMENTS

| | | |
|---|---|---|
| WO | 2016037350 A1 | 3/2016 |
| WO | 2017187516 A1 | 11/2017 |
| WO | 2018051841 A1 | 3/2018 |

OTHER PUBLICATIONS

Ashok, Anubhav, et al. "N2n learning: Network to network compression via policy gradient reinforcement learning." arXiv preprint arXiv:1709.06030. (Year: 2017).*
(Continued)

*Primary Examiner* — Kc Chen
(74) *Attorney, Agent, or Firm* — Crowe & Dunlevy LLC

(57) ABSTRACT

There is provided a system and method of automated design space determination for deep neural networks. The method includes obtaining a teacher model and one or more constraints associated with an application and/or target device or process used in the application configured to utilize a deep neural network; learning an optimal architecture using the teacher model, constraints, a training data set, and a validation data set; and deploying the optimal architecture on the target device or process for use in the application.

23 Claims, 5 Drawing Sheets

(51) Int. Cl.
    *G06N 3/045*         (2023.01)
    *G06N 3/088*         (2023.01)

(58) Field of Classification Search
    CPC ...... G06N 3/0495; G06N 3/082; G06N 3/092;
                           G06N 3/0985; G06F 18/2115
    See application file for complete search history.

(56) References Cited

U.S. PATENT DOCUMENTS

| | | | |
|---|---|---|---|
| 2018/0260695 A1* | 9/2018 | Majumdar | G06N 3/084 |
| 2019/0051290 A1* | 2/2019 | Li | G10L 15/063 |
| 2019/0370658 A1* | 12/2019 | Xie | G06N 3/082 |
| 2021/0058653 A1* | 2/2021 | Jang | G06T 3/4053 |

OTHER PUBLICATIONS

He Y, Lin J, Liu Z, Wang H, Li LJ, Han S. Amc: Automl for model compression and acceleration on mobile devices. InProceedings of the European conference on computer vision (ECCV) Sep. 2018 (pp. 784-800). (Year: 2018).*

International Search Report issued in corresponding PCT Application No. PCT/CA2019/051642; dated Jan. 24, 2020.

European Search Report issued in corresponding EP application No. 19886902; search completed Sep. 12, 2022.

Ashok, Anubhav et al.: N2N Learning: Network to Network Compression via Policy Gradient Reinforcement Learning arXiv:1709. 06030vl, Dec. 17, 2017 (Dec. 17, 2017), XP055618037, Retrieved from the Internet: URL:https://arxiv.org/abs/1709.06030v2 [retrieved on Sep. 3, 2019].

Liu, Sicong et al.: "On-Demand Deep Model Compression for Mobile Devices", Mobile Systems, Applications, and Services, ACM, 2 Penn Plaza, Suite 701NEW YORKNY10121-0701USA, Jun. 10, 2018 (Jun. 10, 2018), pp. 389-400, XP058411399, DOI: 10.1145/3210240.3210337 ISBN: 978-1-4503-5720-3.

* cited by examiner

SYSTEM AND METHOD FOR AUTOMATED DESIGN SPACE DETERMINATION FOR DEEP NEURAL NETWORKS

CROSS-REFERENCE TO RELATED APPLICATION(S)

This application is a National Entry of PCT Application No PCT/CA2019/051642, filed on Nov. 18, 2019, which claims priority to U.S. Provisional Patent Application No. 62/769,403 filed on Nov. 19, 2018, the contents of which are incorporated herein by reference, in their entirety.

TECHNICAL FIELD

The following relates to systems and methods for automated design space determination for deep neural networks, for example by enabling design space exploration.

BACKGROUND

The emergence of deep neural networks (DNNs) in recent years has enabled ground-breaking abilities and applications for modern intelligent systems. State-of-the-art DNNs have been found to achieve high accuracy on tasks in computer vision and natural language processing, even outperforming humans on object recognition tasks. Concurrently, the increasing complexity and sophistication of DNNs is predicated on significant power consumption, model size and computing resources. These factors have been found to limit deep learning's performance in real-time applications, in large-scale systems, and on low-power devices. Modern DNN models require as many as billions of expensive floating-point operations for a single input classification. This problem is exacerbated in high-throughput systems that perform millions of inference computations per second, requiring large and expensive Graphics Processing Units (GPUs). Furthermore, many low-end and cost-effective devices do not have the resources to execute DNN inference, causing users to sacrifice privacy and offload processing to the cloud. Furthermore, tasks with strict latency constraints, such as in automotive and mobility applications often require that inference be performed in a matter of milliseconds, often with limited hardware.

To address these problems, there has been a significant push in academia and industry to make deep learning models more resource-efficient and applicable for real-time, on-device applications. Many techniques have been proposed for model optimization and inference acceleration, as well as hardware implementations of DNNs.

Prior solutions include a variety of core optimization techniques for compressing, accelerating and mapping DNNs on various hardware platforms. The main approach to model optimization is by approximating the original DNN. Techniques include the removal of redundant connections, nodes, filters and layers in the network, also referred to as "pruning". An alternative approach to optimization is knowledge distillation, whereby a "teacher" network is adapted to produce a smaller, "student" network. However, generally these techniques are implemented manually by a domain expert, relying on heuristics and intensive feature engineering. Additionally, these approaches are often found to sacrifice too much accuracy or limit network performance on complex and large data sets.

At present, two fundamental challenges exist with current optimization techniques, namely: 1) that hand-crafted features and domain expertise is required for model optimization, and 2) that time-consuming fine-tuning is often necessary to maintain accuracy.

There exists a need for scalable, automated processes for model optimization on diverse DNN architectures and hardware back-ends. Generally, it is found that the current capacity for model optimization is outpaced by the rapid development of new DNNs and disparate hardware platforms that are applicable, yet largely inefficient for deep learning workloads.

It is an object of the following to address at least one of the above-mentioned challenges.

SUMMARY

It is recognized that a general approach that is agnostic to both the architecture and target hardware(s) is needed to optimize DNNs, making them faster, smaller and energy-efficient for use in daily life. The following relates to deep learning algorithms, for example, deep neural networks. A method for automated optimization, specifically design space exploration, is described. The following relates to the design of a learning process to leverage trade-offs in different deep neural network designs using computation constraints as inputs. The learning process trains an optimizer agent to adapt large, initial networks into smaller networks of similar performance that satisfy target constraints in a data-driven way. By design, the learning process and agents are agnostic to both the network architecture and the target hardware platform.

In one aspect, there is provided a method of automated design space exploration for deep neural networks, the method comprising: obtaining a teacher model and one or more constraints associated with an application and/or target device or process used in the application configured to utilize a deep neural network; learning an optimal student architecture using the teacher model architecture, constraints, a training data set, and a validation data; and deploying the optimal architecture on the target device or process for use in the application.

In another aspect, there is provided a computer readable medium comprising computer executable instructions for automated design space exploration for deep neural networks, the computer executable instructions comprising instructions for performing the above method.

In yet another aspect, there is provided a deep neural network optimization engine configured to perform automated design space exploration for deep neural networks, the engine comprising a processor and memory, the memory comprising computer executable instructions for performing the above method.

BRIEF DESCRIPTION OF THE DRAWINGS

One or more embodiments will now be described with reference to the appended drawings wherein.

DETAILED DESCRIPTION

AI should be accessible and beneficial to various applications in everyday life. With the emergence of deep learning on embedded and mobile devices, DNN application designers are faced with stringent power, memory and cost requirements which often leads to inefficient solutions, possibly preventing people from moving to these devices. The system described below can be used to make deep learning applicable, affordable and scalable by bridging the gap between DNNs and hardware back-ends. To do so, a scalable, DNN-agnostic engine is provided, which can enable a platform-aware optimization. The engine targets information inefficiency in the implementation of DNNs, making them applicable for low-end devices and more efficient in data centers. To provide such functionality, the engine:

is configured to be architecture independent, allowing the engine to support different DNN architectures such as convolution neural networks (CNNs), recurrent neural networks (RNNs), etc.;

is configured to be framework agnostic, enabling developers to readily apply the engine to a project without additional engineering overhead;

is configured to be hardware agnostic, helping end-users to readily change the back-end hardware or port a model from one hardware to another; and provides design space exploration that automatically satisfies different constraints such as accuracy, speed, power, target hardware memory, etc., provided by user, to find an optimal solution.

The system described herein parallels neuroscience and years of academic research, which has found that over time, human brains reduce their neural connections for memory and energy-efficiency. That is, it is found that experience, or wisdom, is about thinking efficiently. The system described herein emulates this process for artificial neural networks.

One of the core challenges with model optimization for DNN inference is evaluating which model architecture is best suited for a given application and environment. The engine described herein uses an AI-driven optimizer to overcome the drawbacks of manual model compression. Based on computation constraints, a software agent selectively optimizes the model. Trade-offs in network design are leveraged to effectively compress a DNN model. The engine combines powerful optimizations and design space exploration in one intelligent framework, maximizing the efficiency, scalability and opportunities for deep learning systems.

Figure 1:
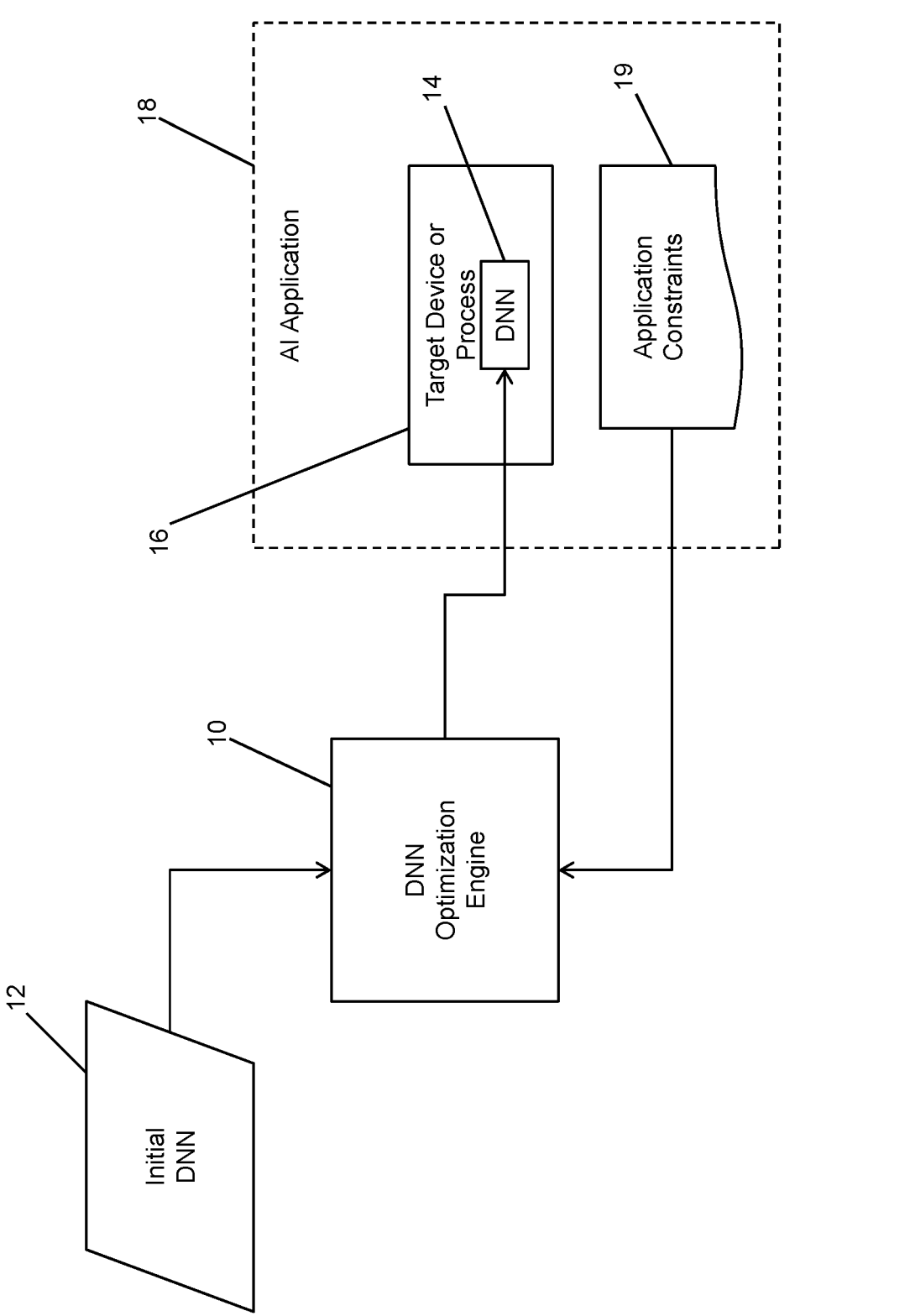
FIG. 1 is a schematic diagram of a system for optimizing a DNN for use in a target device or process used in an artificial intelligence (AI) application.

Turning now to the figures, FIG. 1 illustrates a DNN optimization engine 10 which is configured, as described below, to take an initial DNN 12 and generate or otherwise determine an optimized DNN 14 to be used by or deployed upon a target device or process 16, the "target 16" for brevity. The target 16 is used in or purposed for an AI application 18 that uses the optimized DNN 14. The AI application 18 has one or more application constraints 19 that dictate how the optimized DNN 14 is generated or chosen.

Figure 2:
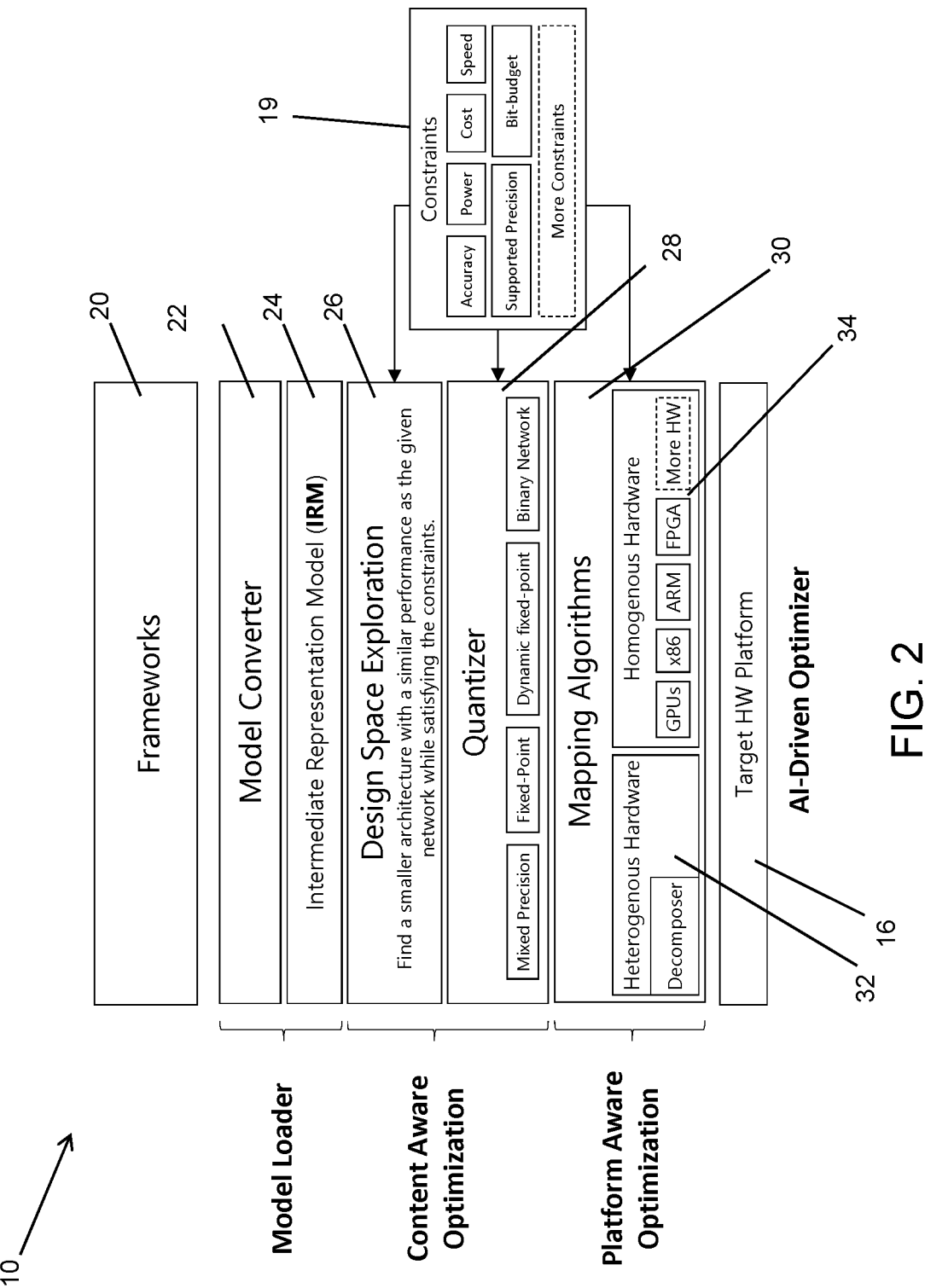
FIG. 2 is a block diagram of an example of a DNN optimization engine.

FIG. 2 illustrates an example of an architecture for the DNN optimization engine 10. The engine 10 in this example configuration includes a model converter 22 which can interface with a number of frameworks 20, an intermediate representation model 24, a design space exploration module 26, a quantizer 28, and mapping algorithms 30 that can include algorithms for both heterogeneous hardware 32 and homogeneous hardware 34. The engine 10 also interfaces with a target hardware (HW) platform 16. The design space exploration module 26, quantizer 28, and mapping algorithms 30 adopt, apply, consider, or otherwise take into account the constraints 19. In this example, the constraints include accuracy, power, cost, supported precision, speed, among others that are possible as shown in dashed lines. FIG. 2 illustrates a framework with maximum re-use in mind, so that new AI frameworks 20, new DNN architectures and new hardware architectures can be easily added to a platform utilizing the engine 10. The engine 10 addresses inference optimization of DNNs by leveraging state-of-the-art algorithms and methodologies to make DNNs applicable for any device 16. This provides an end-to-end framework to optimize DNNs from different deep learning framework front-ends down to low-level machine code for multiple hardware back-ends.

For the model converter 22, the engine 10 is configured to support multiple frameworks 20 (e.g. TensorFlow, Pytorch, etc.) and DNN architectures (e.g. CNN, RNN, etc.), to facilitate applying the engine's capabilities on different projects with different AI frameworks 20. To do so, two layers are included, namely: a) the model convertor 22, which contains each AI frameworks' specifications and DNNs' parser to produce the intermediate representation model (IRM) 24 from the original model; and b) the IRM 24 which represents all DNN models in a standard format.

The engine 10 also provides content aware optimization, by providing a two-level intermediate layer composed of: a) the design space exploration module 26, which is an intermediate layer for finding a smaller architecture with similar performance as the given model to reduce memory footprint and computation (described in greater detail below); and b) the quantizer 28, which is a low-level layer for quantizing the network to gain further computation speedup.

Regarding the design space exploration module 26, DNNs are heavily dependent on the design of hyper-parameters like the number of hidden layers, nodes per layer and activation functions, which have traditionally been optimized manually. Moreover, hardware constraints 19 such as memory and power should be considered to optimize the model effectively. Given spaces can easily exceed thousands of solutions, it can be intractable to find a near-optimal solution manually.

Using the design space exploration module 26, the engine 10 provides an automated multi-objective design space exploration with respect to defined constraints, where a reinforcement learning based agent explores the design space for a smaller network (student) with similar performance of the given network (teacher) trained on the same task. The agent generates new networks by network transformation operations such as altering a layer (e.g. number of filters), altering the whole network (e.g. adding or removing a layer), etc. This agent can efficiently navigate the design space to yield an architecture which satisfies all the constraints for the target hardware. This module aims to reduce DNN memory footprint and computation complexity which are important for low-end devices with limited available memory.

It is also recognized that a major challenge lies in enabling support for multiple hardware back-ends while keeping compute, memory and energy footprints at their lowest. Content aware optimization alone is not considered to be enough to solve the challenge of supporting different hardware back ends. The reason being that primitive operations like convolution or matrix multiplication may be mapped and optimized in very different ways for each hardware back-end. These hardware-specific optimizations can vary drastically in terms of memory layout, parallelization threading patterns, caching access patterns and choice of hardware primitives.

The platform aware optimization layer that includes the mapping algorithms 30 is configured to address this challenge. This layer contains standard transformation primitives commonly found in commodity hardware such as CPUs, GPUs, FPGAs, etc. This additional layer provides a toolset to optimize DNNs for FPGAs and automatically map them onto FPGAs for model inference. This automated toolset can save design time significantly. Importantly, many homogeneous and heterogeneous multicore architectures have been introduced currently to continually improve system performance. Compared to homogeneous multicore systems, heterogeneous ones offer more computation power and efficient energy consumption because of the utilization of specialized cores for specific functions and each computational unit provides distinct resource efficiencies when executing different inference phases of deep models (e.g. Binary network on FPGA, full precision part on GPU/DSP, regular arithmetic operations on CPU, etc.). The engine 10 provides optimization primitives targeted at heterogeneous hardware 32, by automatically splitting the DNN's computation on different hardware cores to maximize energy-efficiency and execution time on the target hardware 16.

Using platform aware optimization techniques in combination with content aware optimization techniques achieves significant performance cost reduction across different hardware platforms while delivering the same inference accuracy compared to the state-of-the-art deep learning approaches.

Figure 3:
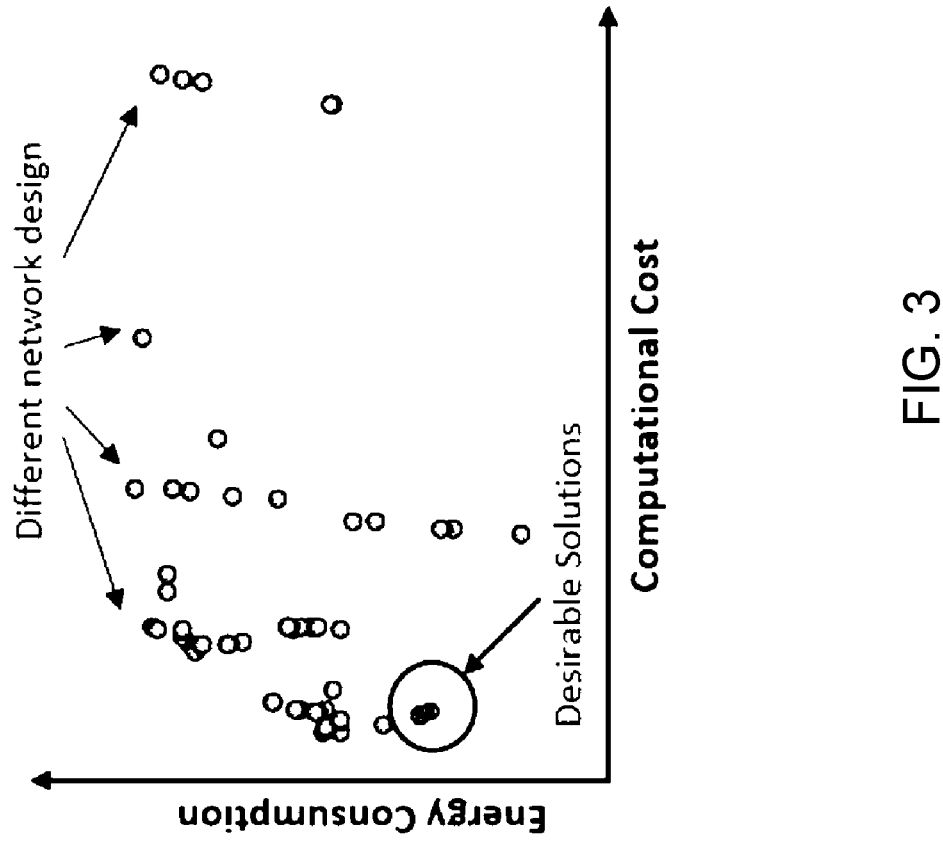
FIG. 3 is a graph comparing energy consumption and computation costs for various example network designs.

For example, assume an application that desires to run a CNN on a low-end hardware with 60 MB memory. The model size is 450 MB and it needs to meet 10 ms critical response time for each inference operation. The model is 95% accurate, however, 90% accuracy is also acceptable. The CNN designers usually use GPUs to train and run their models, but they would now need to deal with memory and computation power limitations, new hardware architecture and satisfying all constraints (such as memory and accuracy) in the same time. It is considered infeasible to find a solution for the target hardware or may require tremendous engineering effort. In contrast, using the engine 10, and specifying the constraints 19, a user can effectively produce the optimized model by finding a feasible solution, reducing time to market and engineering effort, as illustrated in the chart shown in FIG. 3.

Figure 4:
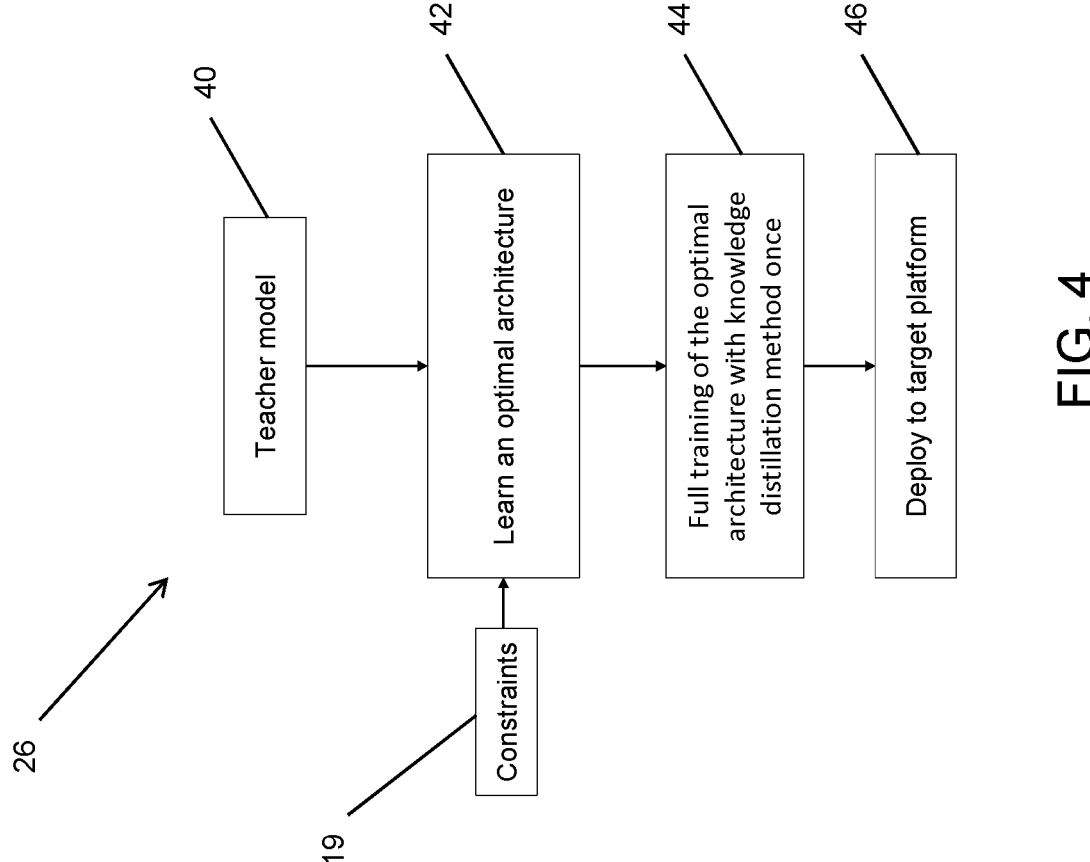
FIG. 4 is a flow chart illustrating a process for optimizing a teacher model DNN for deployment on a target device or process.

Referring now to FIG. 4, the engine 10 provides a framework for multi-objective design space exploration for DNNs with respect to the target hardware 16, where reinforcement learning-based agent 50 (see also FIG. 5) explores the design space for a smaller network (student) which satisfies all the constraints with similar performance of the given network (teacher model 40) trained on the same task. The process includes three steps as illustrated in FIG. 4. In the first step 42, the agent 50 generates new networks by network transformation operations such as altering a layer (e.g. number of filters), altering the whole network (e.g. adding or removing a layer), etc., to produce an optimal model architecture. Then, in step 44, a knowledge distillation method is applied, which is a training method where the smaller student architecture receives information from the larger teacher network. This method can be used once to fully train the optimal architecture produced by step 42 to recover the accuracy on the training dataset 52. Using the knowledge distillation method once at step 44, and using a performance estimator 62 (see also FIG. 5), can make the optimization process fast and scalable for real industry use cases. Ultimately, the trained optimal architecture will be deployed on the target platform 16 at step 46.

Figure 5:
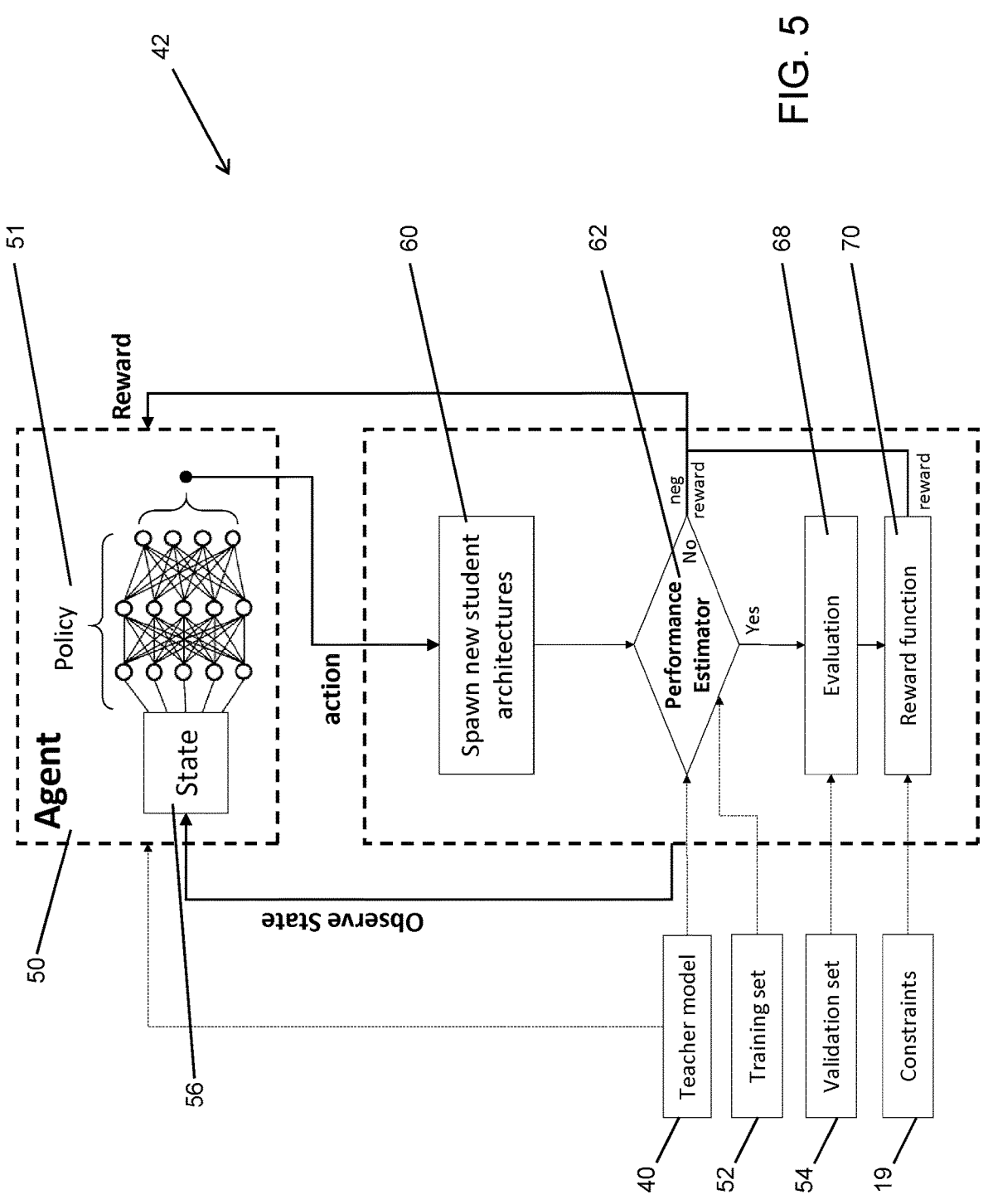
FIG. 5 is a flow chart illustrating operations performed in learning an optimal architecture.

The engine 10 provides for automated optimization of deep learning algorithms. The engine 10 also employs an efficient process for design space exploration 26 of DNNs that can satisfy target computation constraints 19 such as speed, model size, accuracy, power consumption, etc. There is provided a learning process for training optimizer agents that automatically explore design trade-offs starting with large, initial DNNs to produce compact DNN designs in a data-driven way. Once an engineer has trained an initial deep neural network on a training data set to achieve a target accuracy for a task, they would then need to satisfy other constraints for the real-world production environment and computing hardware. The proposed process makes this possible by automatically producing an optimized DNN model suitable for the production environment and hardware 16. Referring to FIG. 5, the agent 50 receives as inputs an initial DNN or teacher model 40, a training data set 52, and target constraints 19. This can be done using the existing deep learning frameworks, without the need to introduce a new framework and the associated engineering overhead. The agent 50 then generates a new architecture from the initial DNN based on target constraints 19. The agent 50 receives a reward based on the performance of the adapted model measured on the training data set 52, guiding the process towards a feasible design. The learning process can converge on a feasible design using minimal computing resources, time and human expert interaction. This process overcomes the disadvantages of manual optimization, which is often limited to certain DNN architectures, applications, hardware platforms and requires domain expertise. The process is a universal method to leverage trade-offs in different DNN designs and to ensure that target computation constraints are met. Furthermore, the process benefits end-users with multiple DNNs in production, each requiring updates and re-training at various intervals by providing a fast, lightweight and flexible method for designing new and compact DNNs. This approach advances current approaches by enabling resource-efficient DNNs that economize data centers, are available for use on low-end, affordable hardware and are accessible to a wider audience aiming to use deep learning algorithms in daily environments.

There are many well-designed architectures, by human or automatic architecture designing methods, that have achieved good performance at the target task. Under restricted computational resources limits, instead of totally neglecting these existing networks and exploring the architecture space from scratch (which does not guarantee to result in better performance architectures), a more economic and efficient alternative could be exploring the architecture space based on these successful networks and reusing their knowledge.

The engine 10 can in part be considered a reinforcement learning agent which learns a policy (optimal optimization strategy) which is applied to the input network (teacher) and produces a smaller network (student), with similar performance to the input network. One can formulate the optimization process to find a smaller network as a sequential decision-making process which can be modeled as Markov Decision Process. The task of the reinforcement learning agent is to learn an optimal policy to maximize the expected total reward.

The reward function 70 should be generic and independent from model specific hyper parameters, and the dataset, and should reflect the problem constraints 19 (e.g. hardware limitations, resource budget, etc.) to discriminate the good and bad student architectures by encouraging the ones which meet the constraints.

As noted above, a reinforcement learning process is proposed as shown in FIG. 4. An initial teacher model 40 is provided after training a given deep neural network architecture on a training data set, such as images or text. Once the teacher model 40 has achieved an acceptable accuracy on a given task, like recognizing objects in images, the reinforcement learning processes are applied to perform the optimization. The reinforcement learning agent 50 receives the teacher model 40, training data set 52, and a set of objective constraints, such as model size (in bytes), inference speed and number of operations. The agent 50 is tasked with learning a new architecture that meets these constraints to ultimately be deployed for inferencing on the target hardware platform 16.

In step 42, shown in FIG. 5, the reinforcement learning policy 51 repeatedly produces a set of transformation actions to generate new student networks at step 60 by shrinking or expanding the teacher network by altering the layers' configuration parameters (e.g. number of filters) and altering the whole network configuration (e.g. adding or removing a layer). As shown in FIG. 5, the agent 50 observes a state that is generated through applying steps 60-70, as follows. The new student architecture(s) spawned at step 60 is/are evaluated at step 62 to determine if there is a promising network. If so, the network is evaluated at step 68, and the reward function 70 applied. If the spawned network is not promising, a negative reward is issued from the results of step 62. Performance estimator 62 is a key feature of the optimizer engine which makes it scalable for industry use cases by estimating the performance of the spawned network in a fraction of second.

That is, if the newly spawned architecture is promising at step 62, the new model will be evaluated (step 68) on the validation data set 54 and the agent then updates the policy 51 based on the reward achieved by the student architecture. The reward function 70 contains terms that reflect the desired accuracy and compression rate to incentivize the agent 50 to produce smaller architectures that do not sacrifice functional accuracy. Over a series of iterations, the agent 50 converges on an acceptable student architecture as measured by the reward function 70.

To reuse weights, the engine 10 leverages the class of function-preserving transformations that help to initialize the new network to represent the same function as the given network but use different parameterization to be further trained to improve the performance. Knowledge distillation at step 66 has been employed as a component of the training process to accelerate the training of the student network, especially for large networks.

The transformation actions may lead to defected networks (e.g. not realistic kernel size, number of filters, etc.). It is not worth it to train these networks as they cannot learn properly. To improve the training process, an apparatus has been employed to detect these defected networks earlier and cut off the learning process by using a negative reward for them.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the engine 10, any component of or related to the engine, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of automated design space exploration for deep neural networks, the method comprising:

obtaining a teacher model deep neural network;

obtaining one or more constraints, the one or more constraints being associated with at least one of: a computer-implemented application, a target computing device or a process used in the computer-implemented application, the computer-implemented application configured to utilize a deep neural network having multiple layers with associated weights and computational parameters;

learning an optimal deep neural network using the teacher model deep neural network, the one or more constraints, a training data set, and a validation data set, wherein learning the optimal deep neural network comprises iteratively:

generating a new student deep neural network by applying network transformation operations to the teacher model deep neural network, wherein the network transformation operations comprise at least one of: altering a number of filters in a layer, altering a number of nodes in the layer, adding the layer to the teacher model deep neural network, or removing the layer from the teacher model deep neural network, and wherein generating the new student deep neural network further comprises applying function-preserving transformations and reusing weights from the teacher model to maintain functional equivalence prior to retraining with knowledge distillation evaluating the new student deep neural network with a performance estimator, performance criteria, and the training data set, wherein the performance estimator measures at least one of: inference time in milliseconds, memory footprint in megabytes, or computational complexity measured in floating-point operations per second of the new student deep neural network, wherein evaluating the new student deep neural network with the performance estimator comprises estimating performance on the target hardware so as to reduce computational overhead relative to full model retraining;

in response to the new student deep neural network failing the performance criteria, bypassing evaluation with the validation data set;

in response to the new student deep neural network satisfying the performance criteria, designating the new student deep neural network as being a satisfactory new student deep neural network and evaluating a performance of the satisfactory new student deep neural network with the validation data set; and generating a reward based on the evaluated performance of the satisfactory new student deep neural network, the reward being based on limitations of the target computing device, wherein the reward comprises a compression reward term and an accuracy reward term that are computed to incentivize production of smaller deep neural networks without sacrificing functional accuracy, wherein the reward is further computed based on hardware constraints of the target computing device, and wherein portions of the deep neural network are automatically mapped onto hardware cores of the target computing device maximizing energy efficiency and execution time on the target computing device;

wherein the iterations converge, as measured by the reward, on an acceptable iteration of the optimal deep neural network; and deploying the optimal deep neural network on the target computing device or utilizing the optimal deep neural network in the process for use in the computer-implemented application, wherein deploying comprises deploying on a resource-constrained computing device.

2. The method of claim 1, wherein the new student deep neural network is generated by shrinking or expanding the teacher model deep neural network by altering the network configuration.

3. The method of claim 1, wherein the reward can be positive or negative according to whether the new student deep neural network is promising or not.

4. The method of claim 1, wherein the reward comprises one or more terms that reflect a desired accuracy and/or compression rate to incentivize production of smaller deep neural networks without sacrificing functional accuracy.

5. The method of claim 1, wherein retraining with knowledge distillation comprises the new student deep neural network receiving information from the teacher model deep neural network or a larger previously determined deep neural network.

6. The method of claim 1, wherein the constraints further comprise at least one of: accuracy, speed, power, target hardware memory.

7. The method of claim 1, wherein the application is an artificial intelligence-based application.

8. The method of claim 1, comprising generating at least two student deep neural networks, and wherein generating the at least two student deep neural networks comprises:

formulating the at least two student deep neural networks at least in part based on a quantizer that learns the optimal deep neural network using lower precision weights, as compared to an input model, across the at least two student deep neural networks.

9. The method of claim 8, comprising: implementing one or more mapping algorithms to map the at least two student deep neural networks to the target device, where the mapping algorithms include transformations for different hardware configurations.

10. The method of claim 1, wherein evaluating the new student deep neural network with the performance estimator comprises estimating, in less than one second, performance on the target hardware so as to reduce computational overhead relative to full model retraining.

11. The method of claim 1, wherein deploying comprises deploying on a resource-constrained computing device requiring inference latency of less than 10 ms.

12. A non-transitory computer readable medium comprising computer executable instructions for automated design space exploration for deep neural networks, the computer executable instructions comprising instructions for:

obtaining a teacher model deep neural network;

obtaining one or more constraints, the one or more constraints being associated with at least one of: a computer-implemented application, a target computing device or a process used in the computer-implemented application, the computer-implemented application configured to utilize a deep neural network having multiple layers with associated weights and computational parameters;

learning an optimal deep neural network using the teacher model deep neural network, the one or more constraints, a training data set, and a validation data set, wherein learning the optimal deep neural network comprises iteratively:

generating a new student deep neural network by applying network transformation operations to the teacher model deep neural network, wherein the network transformation operations comprise at least one of: altering a number of filters in a layer, altering a number of nodes in the layer, adding the layer to the teacher model deep neural network, or removing the layer from the teacher model deep neural network, and wherein generating the new student deep neural network further comprises applying function-preserving transformations and reusing weights from the teacher model to maintain functional equivalence prior to retraining with knowledge distillation;

evaluating the new student deep neural network with a performance estimator, performance criteria, and the training data set, wherein the performance estimator measures at least one of: inference time in milliseconds, memory footprint in megabytes, or computational complexity measured in floating-point operations per second of the new student deep neural network, wherein evaluating the new student deep neural network with the performance estimator comprises estimating, in less than one second, performance on the target hardware so as to reduce computational overhead relative to full model retraining;

in response to the new student deep neural network failing the performance criteria, bypassing evaluation with the validation data set;

in response to the new student deep neural network satisfying the performance criteria, designating the new student deep neural network as being a satisfactory new student deep neural network and evaluating a performance of a satisfactory new student deep neural network with the validation data set; and generating a reward based on the evaluated performance of the satisfactory new student deep neural network, the reward being based on limitations of the target computing device, wherein the reward comprises a compression reward term and an accuracy reward term that are computed to incentivize production of smaller deep neural networks without sacrificing functional accuracy, wherein the reward is further computed based on hardware constraints of the target computing device, and wherein portions of the deep neural network are automatically mapped onto hardware cores of the target computing device maximizing energy efficiency and execution time on the target computing device;

wherein the iterations converge, as measured by the reward, on an acceptable iteration of the optimal deep neural network; and deploying the optimal deep neural network on the target computing device or utilizing the optimal deep neural network in the process for use in the computer-implemented application, wherein deploying comprises deploying on a resource-constrained computing device.

13. The non-transitory computer readable medium of claim 12, further comprising instructions for: wherein evaluating the new student deep neural network with the performance estimator comprises estimating, in less than one second, performance on the target hardware so as to reduce computational overhead relative to full model retraining.

14. The non-transitory computer readable medium of claim 12, further comprising instructions for: wherein deploying comprises deploying on a resource-constrained computing device requiring inference latency of less than 10 ms.

15. A deep neural network optimization engine configured to perform automated design space exploration for deep neural networks, the engine comprising a processor and memory, the memory comprising computer executable instructions for:

obtaining a teacher model deep neural network;

obtaining one or more constraints, the one or more constraints being associated with at least one of: a computer-implemented application, a target computing device, or a process used in the computer-implemented application, the computer-implemented application configured to utilize a deep neural network having multiple layers with associated weights and computational parameters;

learning an optimal deep neural network using the teacher model deep neural network, the one or more constraints, a training data set, and a validation data set, wherein learning the optimal deep neural network comprises iteratively:

generating a new student deep neural network, and wherein generating the new student deep neural network further comprises applying function-preserving transformations and reusing weights from the teacher model to maintain functional equivalence prior to retraining with knowledge distillation;

evaluating the new student deep neural network with a performance estimator, performance criteria, and the training data set by applying network transformation operations to the teacher model deep neural network, wherein the performance estimator measures at least one of: inference time in milliseconds, memory footprint in megabytes, or computational complexity measured in floating-point operations per second of the new student deep neural network, wherein the network transformation operations comprise at least one of: altering a number of filters in a layer, altering a number of nodes in the layer, adding the layer to the teacher model deep neural network, or removing the layer from the teacher model deep neural network, wherein evaluating a new student deep neural network with the performance estimator comprises estimating performance on the target hardware so as to reduce computational overhead relative to full model retraining;

in response to the new student deep neural network failing the performance criteria, bypassing evaluation with the validation data set;

in response to the new student deep neural network satisfying the performance criteria, designating the new student deep neural network as being a satisfactory new student deep neural network and evaluating a performance of a satisfactory new student deep neural network with the validation data set; and generating a reward based on the evaluated performance of the satisfactory new student deep neural network, the reward being based on limitations of the target computing device, wherein the reward comprises a compression reward term and an accuracy reward term that are computed to incentivize production of smaller deep neural networks without sacrificing functional accuracy, wherein the reward is further computed based on hardware constraints of the target computing device, and wherein portions of the deep neural network are automatically mapped onto hardware cores of the target computing device maximizing energy efficiency and execution time on the target computing device;

wherein the iterations converge, as measured by the reward, on an acceptable iteration of the optimal deep neural network; and deploying the optimal deep neural network on the target computing device or utilizing the optimal deep neural network in the process for use in the computer-implemented application, wherein deploying comprises deploying on are source-constrained computing device.

16. The engine of claim 15, further comprising instructions for:

transferring knowledge from the teacher model deep neural network to train with a knowledge distillation process.

17. The engine of claim 16, wherein the reward function is negative for instances of bypassing evaluation for failed student deep neural networks.

18. The engine of claim 16, wherein the reward function comprises one or more terms that reflect a desired accuracy and/or compression rate to incentivize production of smaller deep neural networks without sacrificing functional accuracy.

19. The engine of claim 16, wherein the knowledge distillation process comprises the new student deep neural network receiving information from the teacher model deep neural network or a larger previously determined deep neural network.

20. The engine of claim 15, wherein the new student deep neural network is generated by shrinking or expanding the teacher model deep neural network by altering the network configuration.

21. The engine of claim 15, wherein learning the optimal deep neural network comprises generating new networks by applying network transformation operations.

22. The engine of claim 15, wherein evaluating the new student deep neural network with the performance estimator comprises estimating, in less than one second, performance on the target hardware so as to reduce computational overhead relative to full model retraining.

23. The engine of claim 15, wherein deploying comprises deploying on a resource-constrained computing device requiring inference latency of less than 10 ms.

* * * * *